US012765453B2

(12) United States Patent
Fang et al.

(10) Patent No.: US 12,765,453 B2
(45) Date of Patent: Oct. 20, 2026

(54) ACTIVE-PASSIVE DUAL OVERLOAD DISENGAGEMENT MECHANISM FOR MOWER BLADE

(71) Applicant: Jiangsu Artum Intelligent Technology Co., Ltd., Taicang City (CN)

(72) Inventors: Yunzhou Fang, Taicang City (CN); Meng Du, Taicang City (CN); Jun Huo, Taicang City (CN); Yi Guo, Taicang City (CN)

(73) Assignee: JIANGSU ARTUM INTELLIGENT TECHNOLOGY CO., LTD., Taicang City (CN)

( * ) Notice: Subject to any disclaimer, the term of this patent is extended or adjusted under 35 U.S.C. 154(b) by 166 days.

(21) Appl. No.: 18/935,104

(22) Filed: Nov. 1, 2024

(65) Prior Publication Data

US 2025/0301952 A1 Oct. 2, 2025

(30) Foreign Application Priority Data

Mar. 27, 2024 (CN) ........................ 202410359060.6

(51) Int. Cl.
*A01D 75/18* (2006.01)
*A01D 34/73* (2006.01)
*A01D 101/00* (2006.01)

(52) U.S. Cl.
CPC ........... *A01D 34/733* (2013.01); *A01D 75/18* (2013.01); *A01D 2101/00* (2013.01)

(58) Field of Classification Search
CPC .............................. A01D 34/733; A01D 75/18
See application file for complete search history.

(56) References Cited

U.S. PATENT DOCUMENTS 6,205,755 B1 * 3/2001 Bontrager ............ A01D 34/733 56/295
7,958,710 B2 * 6/2011 Gilpatrick .......... A01D 34/6806 56/17.5

(Continued)

FOREIGN PATENT DOCUMENTS

CN 209234282 U * 8/2019
CN 215301571 U * 12/2021

(Continued)

OTHER PUBLICATIONS

English Translation of CN-215301571-U (Year: 2021).*

(Continued)

*Primary Examiner* — Claude J Brown
(74) *Attorney, Agent, or Firm* — Moore & Van Allen PLLC

(57) ABSTRACT

Provided is an active-passive dual overload disengagement mechanism for a mower blade. The active-passive dual overload disengagement mechanism for a mower blade includes a blade holder and a control rod, where the blade holder is configured to connect an output shaft of a drive motor to the mower blade in a transmission manner, and release a transmission state between the output shaft of the drive motor and the mower blade when the mower blade impacts against a hard obstacle. According to the present invention, the mower blade is an external sheet structure. Blades of two mower blades are provided symmetrically, and can cut a tough weed. The control rod includes one end connected to the blade holder, and the other end connected to a servo motor. The servo motor can drive the control rod to move the blade holder to a preset position.

10 Claims, 7 Drawing Sheets

(56) References Cited

U.S. PATENT DOCUMENTS

| | | | | |
|---|---|---|---|---|
| 2018/0160621 | A1* | 6/2018 | Hammar | F16D 11/14 |
| 2023/0309445 | A1* | 10/2023 | Krolo | A01D 34/733<br>56/392 |

FOREIGN PATENT DOCUMENTS

| | | | | | |
|---|---|---|---|---|---|
| CN | 218897581 | U | | 4/2023 | |
| EP | 2923552 | A1 | * | 9/2015 | A01D 34/828 |
| KR | 200265640 | Y1 | * | 2/2002 | A01D 34/6806 |

OTHER PUBLICATIONS

English Translation of CN-209234282-U (Year: 2019).*
English Translation of KR-200265640-Y1 (Year: 2002).*
Jiangsu Hanmann Smart Technology Inc., Chinese Patent Application No. 202410359060.6, Office Action, Nov. 19, 2025.

* cited by examiner

ACTIVE-PASSIVE DUAL OVERLOAD DISENGAGEMENT MECHANISM FOR MOWER BLADE

CROSS REFERENCE TO RELATED APPLICATION

This patent application claims the benefit and priority of Chinese Patent Application No. 202410359060.6, filed with the China National Intellectual Property Administration on Mar. 27, 2024, the disclosure of which is incorporated by reference herein in its entirety as part of the present application.

TECHNICAL FIELD

The present disclosure relates to the technical field of mowers, and in particular to an active-passive dual overload disengagement mechanism for a mower blade.

BACKGROUND

Electric mowers are faced with a complex environment in a mowing operation. Hidden hard objects in a thick lawn such as bricks and stones impact against a mowing blade frequently. When a mower blade in high-speed rotation suddenly impacts against an obstacle beyond a cutting capacity of the mower blade, such as the stone, the concrete block and the reinforcing steel bar, the mower blade, a blade holder connected to the mower blade, an output shaft and even a rear-end motor will be damaged irreversibly. Broken hard debris is more likely to hurt surrounding people.

The conventional soft mower blade (mowing rope) can prevent the damage to the blade holder caused by the impact against the obstacle, but cannot cope with dense and tough weeds for an insufficient cutting capacity. Moreover, the centrifugal blade cannot be extended out easily for use. Therefore, a device capable of cutting the dense and tough weeds, and capable of preventing damage to the blade holder, the motor and the like for the impact against the obstacle such as the stone is needed urgently.

SUMMARY OF THE INVENTION

An objective of the present disclosure is to provide an active-passive dual overload disengagement mechanism for a mower blade, to solve problems in the prior art. The present disclosure can cut a tough weed, and can release a transmission state with a drive motor when a mower blade impacts against a hard obstacle, thereby preventing damage to the blade holder and the drive motor, etc.

To achieve the foregoing objective, the present disclosure provides the following solutions:

The present disclosure provides an active-passive dual overload disengagement mechanism for a mower blade, including:

a blade holder configured to connect an output shaft of a drive motor to the mower blade in a transmission manner, and release a transmission state between the output shaft of the drive motor and the mower blade when the mower blade impacts against a hard obstacle, where the mower blade is an external sheet structure; blades of two mower blades are provided symmetrically, and can cut a tough weed; and a control rod including one end connected to the blade holder, and the other end connected to a servo motor, where the servo motor can drive the control rod to move the blade holder to a preset position, and is configured to change the transmission state between the output shaft of the drive motor and the mower blade.

Optionally, the blade holder includes a blade holder sleeve; one end of the blade holder sleeve is open; an external toothed disc is fixedly and circumferentially provided on an inner sidewall of the other end of the blade holder sleeve; the end of the blade holder sleeve provided with the external toothed disc is provided with a through hole; the output shaft of the drive motor is in transmission connection with an adapter shaft; the adapter shaft penetrates into the through hole of the blade holder sleeve; an end of the adapter shaft located in the blade holder sleeve is fixedly provided with an internal toothed disc; the internal toothed disc can be in engagement and transmission connection with the external toothed disc; and the mower blade is fixedly connected to an outer wall of the open end of the blade holder sleeve. According to the present disclosure, since the internal toothed disc is in engagement and transmission connection with the external toothed disc, the mower blade is controlled by the drive motor for mowing. In case of an impact against the hard obstacle such as a stone, the mower blade and the external toothed disc fixed to the mover blade stop instantaneously, and the internal toothed disc continues to keep a high-speed movement. When a torque transferred by an engaged surface between the internal toothed disc and the external toothed disc exceeds a preset value, the external toothed disc and the blade holder sleeve are pushed to move toward the drive motor, thereby realizing passive disengagement between the external toothed disc and the internal toothed disc at an input end, and preventing damage to the drive motor.

Optionally, an elastic member is fixedly provided on an inner wall of the open end of the blade holder sleeve; a position of the elastic member can be adjusted along an axial direction of the blade holder sleeve; and one end of the elastic member abuts against an end surface of an end of the internal toothed disc away from the adapter shaft, so as to provide an engagement pressure for the internal toothed disc and the external toothed disc.

Optionally, the active-passive dual overload disengagement mechanism for a mower blade further includes an adjustment disc; an external screw thread is provided on an outer sidewall of the adjustment disc; an internal screw thread is provided on an inner wall of the blade holder sleeve; the adjustment disc is located in the blade holder sleeve, and threadedly connected to the blade holder sleeve; and the elastic member is located between the adjustment disc and the internal toothed disc. A hexagonal hole is formed in a center of the adjustment disc. The adjustment disc can be rotated through an external adjustment rod, such that the adjustment disc moves close to the internal toothed disc or away from the internal toothed disc along the inner wall of the blade holder sleeve, and the elastic member can be compressed to adjust the torque in the passive disengagement.

Optionally, the elastic member is a spring.

Optionally, a limiting groove is circumferentially formed in an outer wall of an end of the blade holder sleeve away from the mower blade; an axial limiting device is nested in the limiting groove; the axial limiting device can rotate relative to the blade holder sleeve; the axial limiting device is fixedly connected to one end of the control rod; and the control rod can drive the axial limiting device to move the blade holder sleeve synchronously along an axial direction. The axial limiting device does not rotate with the blade holder sleeve in the operation of the mower blade. When the servo motor drives the control rod to move up and down, the axial limiting device can drive the blade holder sleeve to move up and down, and the internal toothed disc and the external toothed disc are disengaged or engaged, thereby actively controlling an engagement state between the internal toothed disc and the external toothed disc.

Optionally, the servo motor is provided at an end of the drive motor away from the blade holder sleeve; a motor shaft of the servo motor is perpendicular to the output shaft of the drive motor; the motor shaft of the servo motor is fixedly connected to an eccentric wheel; an outer end surface of the eccentric wheel is movably connected to an L-shaped plate through an eccentric connecting rod; the L-shaped plate is connected to one end of the control rod; and the other end of the control rod is hinged to the axial limiting device.

Optionally, the axial limiting device includes two symmetric semicircular rings; two ends of the semicircular rings each are fixedly provided with an extension rod; after the two semicircular rings are docked and clamped into the limiting groove, two extension rods located at a same side can abut against each other; and the two extension rods located at the same side are hinged to one end of the control rod.

Optionally, the external toothed disc and the internal toothed disc each are circumferentially provided with oblique teeth.

Optionally, the motor shaft of the servo motor is fixedly connected to a center of the eccentric wheel; the eccentric connecting rod is fixedly provided on the outer end surface of the eccentric wheel; in response to a maximum linear distance between the eccentric connecting rod and the mower blade, the external toothed disc and the internal toothed disc are disengaged; in response to a minimum linear distance between the eccentric connecting rod and the mower blade, the external toothed disc and the internal toothed disc are locked and engaged all the time; and when a linear distance between the eccentric connecting rod and the mower cutter falls between the maximum linear distance and the minimum linear distance, the internal toothed disc and the external toothed disc are in a free state, with an engagement state adjusted passively according to whether the mower blade impacts against the hard obstacle.

Compared with the prior art, the present disclosure has the following technical effects:

According to the present disclosure, the blade holder is connected to the output shaft of the drive motor and the mower blade. The output shaft of the motor is connected to the internal toothed disc. The mower blade is fixed to the external toothed disc. The external toothed disc and the internal toothed disc are engaged, with the engagement pressure provided by the elastic member. The control rod is driven by the servo motor. By adjusting a state of the control rod, the engagement state between the internal toothed disc and the external toothed disc is actively controlled and sensed. In response to a mowing operation, the control rod is in the free state. The output shaft of the motor transfers the torque to the mower blade through the internal toothed disc and the external toothed disc for the mowing operation. When the mower blade encounters the hard obstacle, the internal toothed disc and the external toothed disc are disengaged. This releases the engagement state passively to prevent damage to the blade and the drive motor.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

In the figures: 1—blade holder sleeve, 2—control rod, 3—mower blade, 4—drive motor, 5—servo motor, 6—eccentric wheel, 7—eccentric connecting rod, 8—internal toothed disc, 9—external toothed disc, 10—spring, 11—adjustment disc, 12—adapter shaft, 13—limiting groove, 14—axial limiting device, and 15—L-shaped plate.

DETAILED DESCRIPTION OF THE EMBODIMENTS

The technical solutions in the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide an active-passive dual overload disengagement mechanism for a mower blade, to solve problems in the prior art. The present disclosure can cut a tough weed, and can release a transmission state with a drive motor when a mower blade impacts against a hard obstacle, thereby preventing damage to the blade holder and the drive motor, etc.

In order to make the above objective, features and advantages of the present disclosure clearer and more comprehensible, the present disclosure will be further described in detail below in combination with accompanying drawings and particular implementations.

Figure 1:
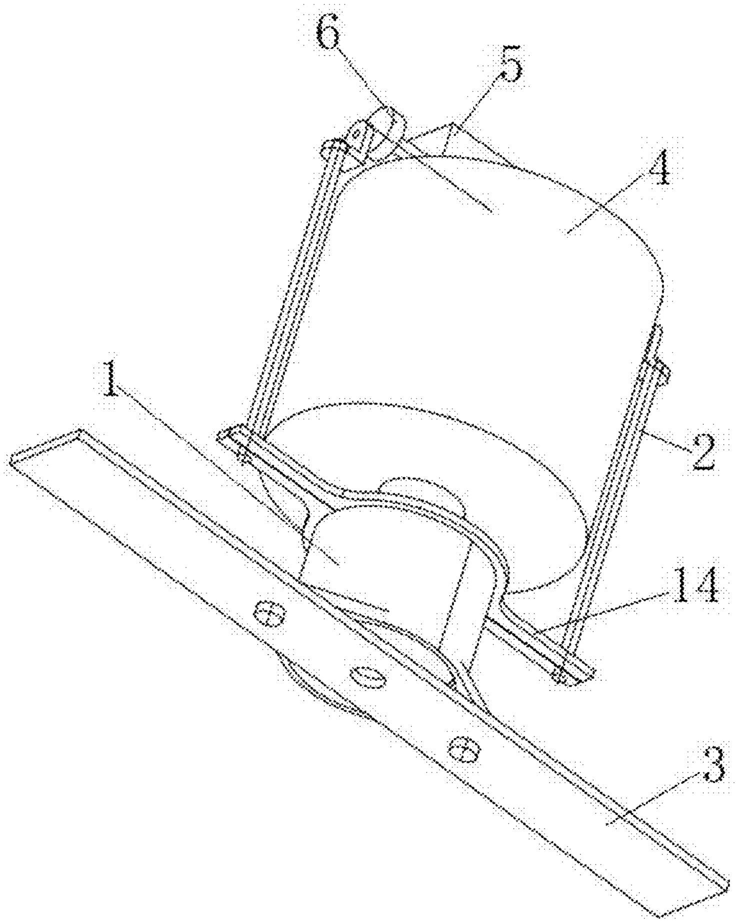
FIG. 1 is a stereoscopic view of an active-passive dual overload disengagement mechanism for a mower blade according to the present disclosure.
Figure 2:
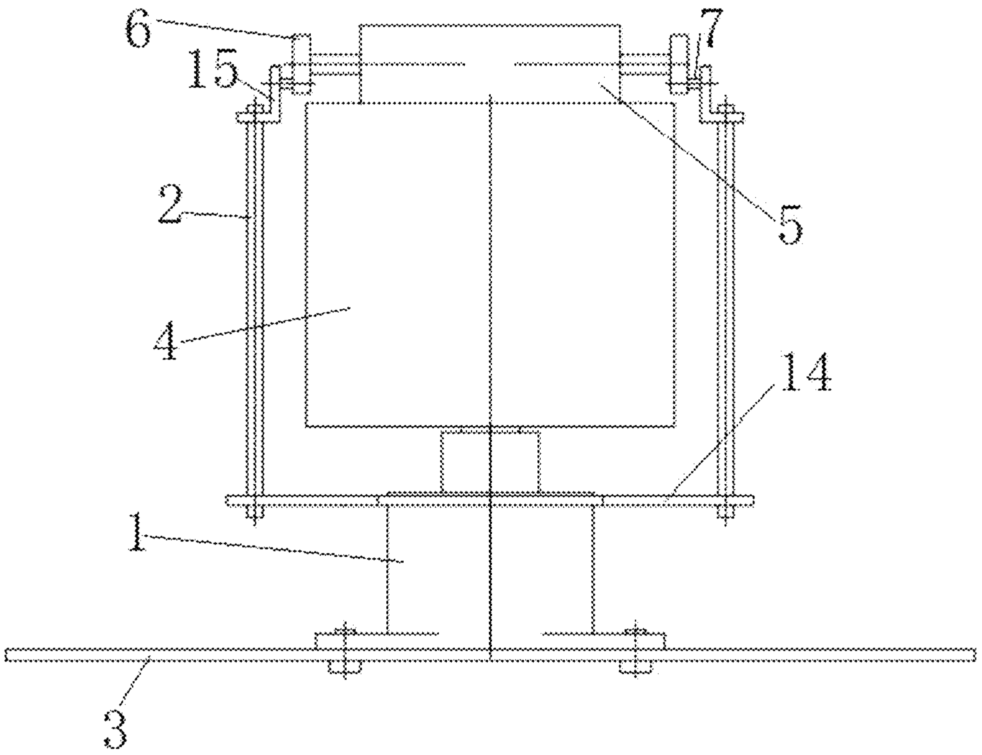
FIG. 2 is a front view of an active-passive dual overload disengagement mechanism for a mower blade according to the present disclosure.
Figure 3:
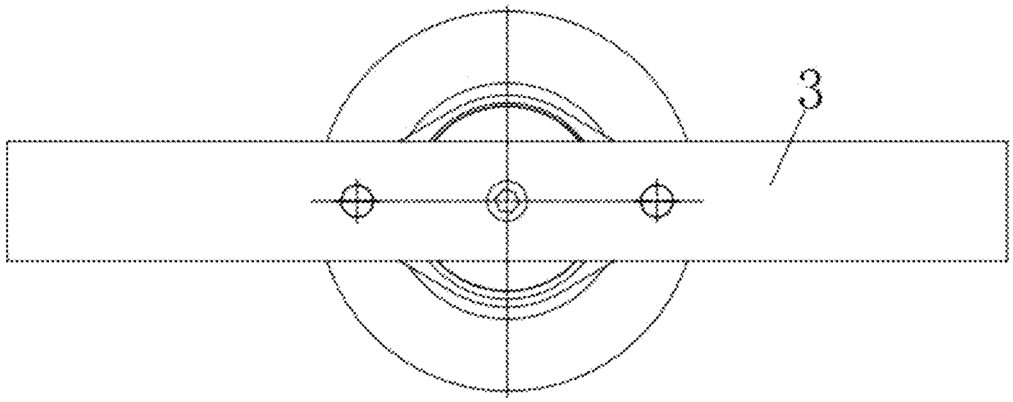
FIG. 3 is a bottom view of an active-passive dual overload disengagement mechanism for a mower blade according to the present disclosure.
Figure 4:
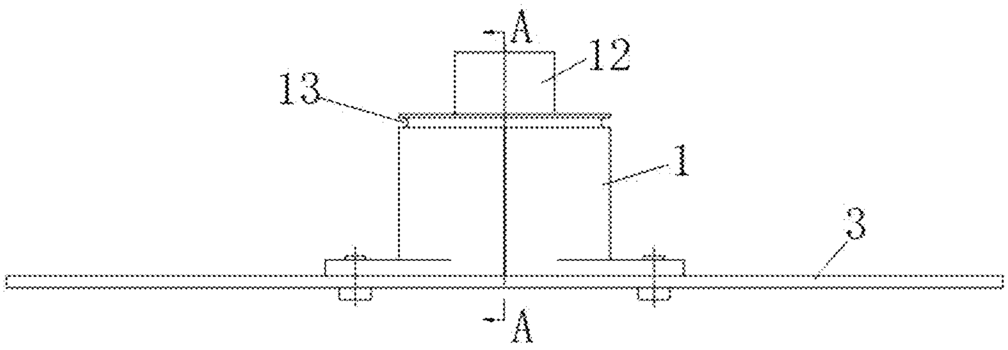
FIG. 4 is a schematic view after an internal toothed disc, an external toothed disc and a mower blade are mounted according to the present disclosure.
Figure 5:
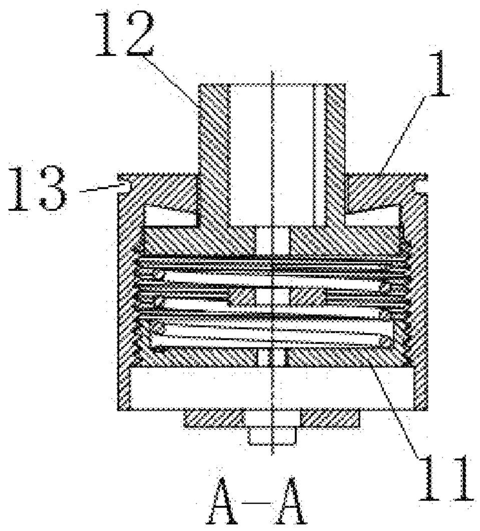
FIG. 5 is a schematic sectional view along A-A in FIG. 4.
Figure 6:
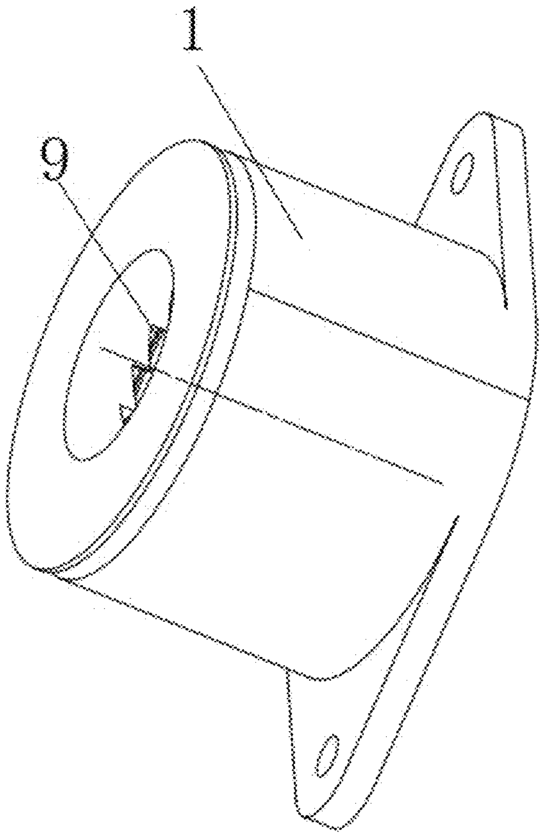
FIG. 6 is a schematic view of a blade holder sleeve according to the present disclosure.
Figure 7:
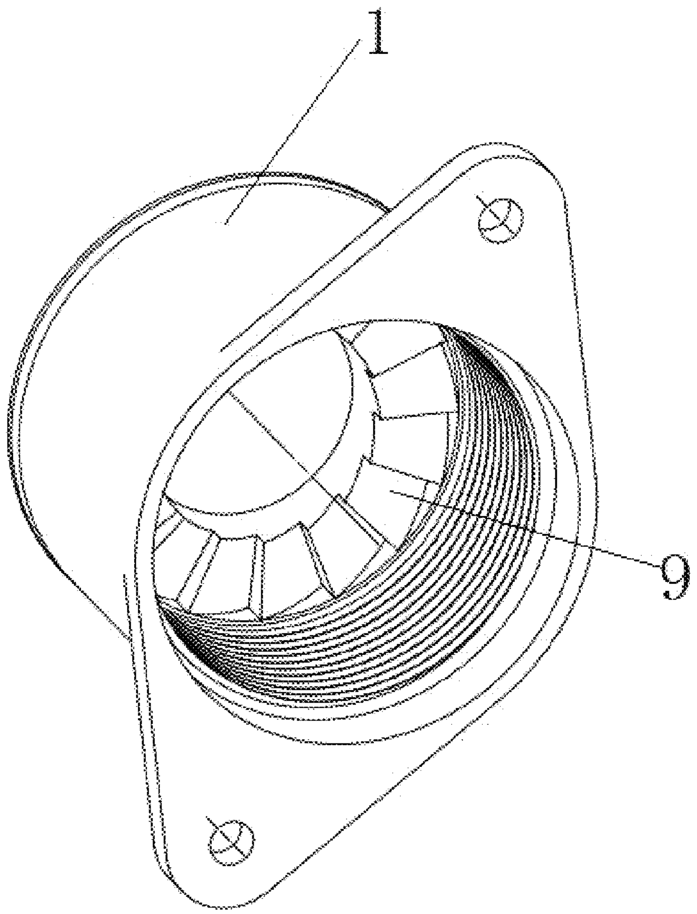
FIG. 7 is a schematic view of an internal structure of a blade holder sleeve according to the present disclosure.
Figure 8:
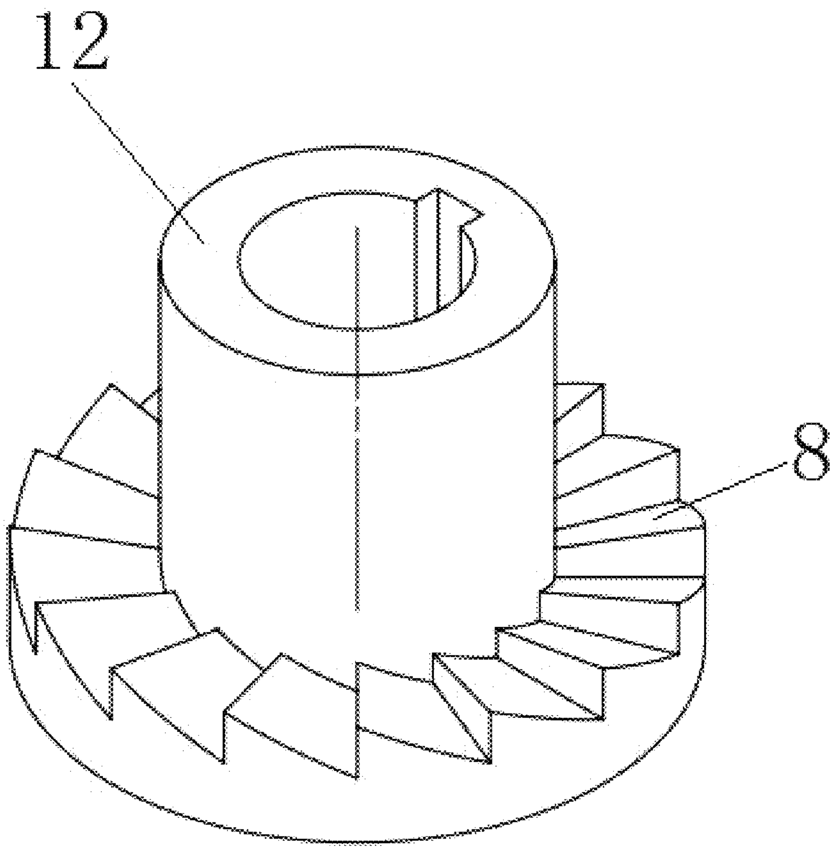
FIG. 8 is a schematic structural view of an internal toothed disc according to the present disclosure.
Figure 9:
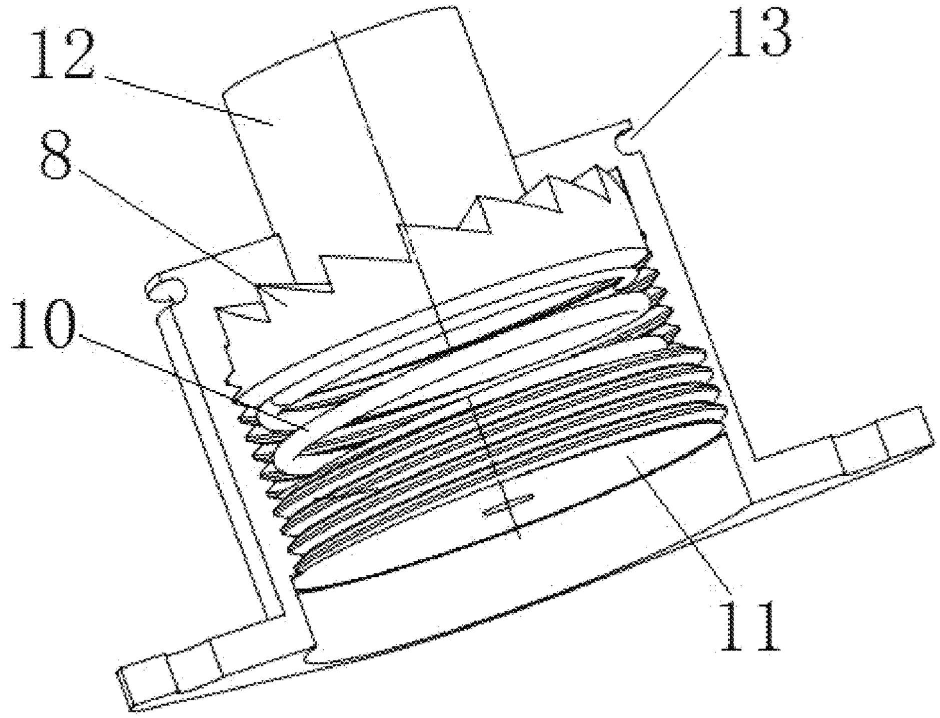
FIG. 9 is a schematic view illustrating cooperation among an internal toothed disc, an external toothed disc and a spring according to the present disclosure.

As shown in FIG. 1 to FIG. 9, the active-passive dual overload disengagement mechanism for a mower blade provided by the present disclosure includes a blade holder and a control rod 2. The blade holder includes a blade holder sleeve 1. One end of the blade holder sleeve 1 is open. An external toothed disc 9 is fixedly and circumferentially provided with on an inner sidewall of the other end of the blade holder sleeve. The end of the blade holder sleeve 1 provided with the external toothed disc 9 is provided with a through hole. An output shaft of a drive motor 4 is in transmission connection with an adapter shaft 12. In an embodiment, an adapter shaft hole is formed at one end of the adapter shaft 12. A strip groove is formed in an inner wall of the adapter shaft hole. The output shaft of the drive motor 4 is fixedly inserted into the adapter shaft hole. A wedge is inserted into the strip groove to realize fixation on the output shaft and the adapter shaft 12. The adapter shaft 12 penetrates into the through hole of the blade holder sleeve 1. An end of the adapter shaft 12 located in the blade holder sleeve 1 is fixedly provided with an internal toothed disc 8. The internal toothed disc 8 can be in engagement and transmission connection with the external toothed disc 9. The mower blade 3 is fixedly connected to an outer wall of the open end of the blade holder sleeve 1. According to the present disclosure, since the internal toothed disc 8 is in engagement and transmission connection with the external toothed disc 9, a torque is transferred through the drive motor 4 to control the mower blade 3 for mowing. In case of an impact against a hard obstacle such as a stone, the mower blade 3 and the external toothed disc 9 fixed to the mover blade stop instantaneously, and the internal toothed disc 8 continues to keep a high-speed movement. When the torque transferred by an engaged surface between the internal toothed disc and the external toothed disc exceeds a preset value, the external toothed disc 9 and the blade holder sleeve 1 are pushed to move toward the drive motor 4, and the internal toothed disc and the external toothed disc are slipped off, thereby realizing passive overload disengagement between the external toothed disc 9 and the internal toothed disc 8 at an input end, and preventing damage to the drive motor 4.

In order to realize normal engagement and transmission between the internal toothed disc 8 and the external toothed disc 9 to drive the mower blade 3 to work in the present disclosure, an engagement pressure is to be provided for the internal toothed disc 8 and the external toothed disc 9. To this end, a spring 10 is fixed on an inner wall of the open end of the blade holder sleeve 1 in the present disclosure. The spring 10 includes one end abutting against an end surface of the internal toothed disc 8, and the other end fixedly connected to the blade holder sleeve 1, thereby providing the engagement pressure for the internal toothed disc 8 and the external toothed disc 9. A position of the spring 10 can be adjusted along an axial direction of the blade holder sleeve 1, thus changing the engagement pressure. After the spring 10 moves outward and is fixed, the spring applies a small elastic force to the internal toothed disc 8, and a small engagement pressure is formed between the internal toothed disc 8 and the external toothed disc 9. This is suitable for cutting a soft little grass. In case of the hard obstacle, the mower blade 3 cannot be smooth for cutting, a load on the drive motor 4 exceeds a limit value, and the internal toothed disc 8 and the external toothed disc 9 can be disengaged timely for protection. After the spring 10 moves close to the internal toothed disc 8 and is fixed, the spring applies a large elastic force to the internal toothed disc 8, such that a torque for disengaging the internal toothed disc 8 and the external toothed disc 9 is larger. This is suitable for cutting a tough weed, and does not cause disengagement of the internal toothed disc 8 and the external toothed disc 9 in the cutting process of the tough weed. In case of the hard obstacle such as the stone, the internal toothed disc 8 and the external toothed disc 9 are disengaged passively for protection.

In the present disclosure, the external toothed disc 9 and the internal toothed disc 8 each are circumferentially provided with oblique teeth, and are in the engagement and transmission connection through the oblique teeth. One end surface of each of the oblique teeth is an oblique toothed surface. Slip-off requirements are met when an output torque T of the oblique tooth meets a following condition:

$$\frac{T}{R}\cos\theta > F\sin\theta\mu$$

By this time, the internal toothed disc 8 and the external toothed disc 9 are disengaged, the drive motor 4 drives the internal toothed disc 8 to rotate continuously, and the external toothed disc 9, the blade holder sleeve 1 and the mower blade 3 stop for protection. In the foregoing equation, R is a radius of the internal toothed disc 8 or the external toothed disc 9, θ is an inclination angle of the oblique tooth, F is a pressure of the spring 10, and u is a coefficient of friction.

In a preferred embodiment of the present disclosure, the oblique tooth on the external toothed disc 9 and the internal toothed disc 8 includes one end being an oblique structure, and the other end being a perpendicular sectional structure. Regardless of whether the control rod 2 is located at a free position or a locked position, the drive motor 4 can rotate reversely for braking, and the mower blade 3 cannot be disengaged. This ensures reliable braking in any case.

In a specific embodiment of the present disclosure, in order to adjust the pressure of the spring 10 more flexibly, an adjustment disc 11 is provided particularly. A main body of the adjustment disc is a circular disc structure with a hexagonal hole in a center. A vertical flange is circumferentially provided at an edge of the circular disc. An external screw thread is provided on an outer wall of the vertical flange. An internal screw thread is provided on an inner wall of the blade holder sleeve 1. The adjustment disc 11 is placed from the open end of the blade holder sleeve 1, with the external screw thread threadedly connected to the internal screw thread of the blade holder sleeve 1. The spring 10 is located between the adjustment disc 11 and the internal toothed disc 8. Through an adjustment rod or an adjustment wrench externally inserted into the hexagonal hole, the adjustment disc 11 can be rotated to move close to the internal toothed disc 8 or away from the internal toothed disc 8 along an inner wall of the blade holder sleeve 1, thereby compressing the spring 10, changing the pressure of the spring 10, and adjusting a torque in passive disengagement.

In addition to passively disengaging the internal toothed disc 8 and the external toothed disc 9 for protection when the mower blade 3 encounters the obstacle, the present disclosure can further realize active overload disengagement or locking between the internal toothed disc 8 and the external toothed disc 9. To this end, a limiting groove 13 is circumferentially formed in an outer wall of an end of the blade holder sleeve 1 away from the mower blade 3. An axial limiting device 14 is nested in the limiting groove 13. The axial limiting device 14 can rotate relative to the blade holder sleeve 1. The axial limiting device 14 is fixedly connected to one end of the control rod 2. The control rod 2 can drive the axial limiting device 14 to move the blade holder sleeve 1 synchronously along an axial direction. The axial limiting device 14 does not rotate with the blade holder sleeve 1 in the operation of the mower blade 3. When the servo motor 5 drives the control rod 2 to move up and down, the axial limiting device 14 can drive the blade holder sleeve 1 to move up and down, and the internal toothed disc 8 and the external toothed disc 9 are disengaged or engaged, thereby actively controlling an engagement state between the internal toothed disc 8 and the external toothed disc 9.

There are no specific limits made on a manner for providing the control rod 2 and the servo motor 5. The other end of the control rod 2 may further be provided with a cylinder structure. A cylinder rod is parallel to the output shaft of the drive motor 4. Through a cylinder, the control rod 2 is pulled to move up and down, and the control rod 2 and the blade holder sleeve 1 can also be controlled to move up and down. A displacement sensor capable of sensing a position of the blade holder sleeve 1 is provided on the cylinder. In a preferred embodiment of the present disclosure, in order to control the internal toothed disc 8 and the external toothed disc 9 more accurately, the servo motor 5 is provided at an end of the drive motor 4 away from the blade holder sleeve 1. A motor shaft of the servo motor 5 is perpendicular to the output shaft of the drive motor 4. The motor shaft of the servo motor 5 is fixedly connected to an eccentric wheel 6. The motor shaft of the servo motor 5 is fixedly connected to a center of the eccentric wheel 6. An eccentric connecting rod 7 is fixed on an outer end surface of the eccentric wheel 6. The outer end surface of the eccentric wheel 6 is movably connected to one end surface of an L-shaped plate 15 through the eccentric connecting rod 7. The other end surface of the L-shaped plate 15 is movably connected to one end of the control rod 2. The other end of the control rod 2 is hinged to the axial limiting device 14. In the embodiment, within a virtual coordinate axes established based on a plane where the eccentric wheel 6 is located, there are a position of 270° when the eccentric connecting rod 7 is located at a lowest end, a position of 90° when the eccentric connecting rod 7 is located at a highest end, as well as a position of 180° and a position of 0° when the eccentric connecting rod 7 are located at two horizontal ends. When the eccentric connecting rod 7 is located at 270°, the control rod 2 is located at the lowest end, the internal toothed disc 8 and the external toothed disc 9 are locked and engaged all the time, and the external toothed disc 9 is fixed by the control rod 2 at an engaged position with the internal toothed disc 8. This can make a system output a power forcibly, thereby meeting operation requirements of special cases (such as shrubs and reeds). When the servo motor 5 controls the eccentric wheel 6 to rotate, and the eccentric connecting rod 7 is located at 90°, the control rod 2 connected to the eccentric connecting rod is locked at a top dead center (TDC). By this time, the blade holder sleeve 1 moves up, the lower toothed disc and the upper toothed disc are disengaged, the drive motor 4 cannot drive the mower blade 3 to operate, and the external toothed disc 9 is lifted by the control rod 2 to a disengaged position. This can realize active output disengagement, and facilitate motor start-up under a heavy load. Therefore, the present disclosure realizes active adjustment on the engagement state between the internal toothed disc 8 and the external toothed disc 9.

When the servo motor 5 is not locked, and the eccentric wheel 6 rotates freely between 270° and 90°, the internal toothed disc 8 and the external toothed disc 9 are in a free state. In the mowing operation, the control rod 2 is in a free state. The output shaft of the drive motor 4 transfers a torque to the mower blade 3 through the internal toothed disc and the external toothed disc 9 for the mowing operation. According to whether the obstacle is encountered, the engagement state between the internal toothed disc 8 and the external toothed disc 9 is controlled passively. When the mower blade 3 in high-speed rotation suddenly impacts against the obstacle (such as the stone), the mower blade 3 and the external toothed disc 9 fixed to the mower blade stop instantaneously, and the internal toothed disc 8 continues to keep a high-speed movement. When the torque transferred by an engaged surface between the internal toothed disc and the external toothed disc 9 exceeds a T value in the above equation, the external toothed disc 9 is pushed to move toward the drive motor 4, thereby disengaging from the internal toothed disc 8 at an input end.

On the basis of the above solution, a sensing device is further provided in the present disclosure. An angle sensor is provided on the eccentric wheel 6. By monitoring a position of the eccentric wheel 6, the engagement state between the internal toothed disc 8 and the external toothed disc 9 is sensed. In case of disengagement, the control rod 2 and the external toothed disc 9 move together to push the eccentric wheel 6 to rotate from 270° to 90°. The system can know a disengagement state through an angle of the eccentric wheel 6. Meanwhile, a load on the drive motor 4 makes a characteristic current changed. That is, the current has a characteristic fluctuation with a frequency f being $f=N*n/60$.

This gives a second feedback to the system, and further clarifies the disengagement state between the internal toothed disc and the external toothed disc. In the foregoing equation, N is a real-time rotational speed of the drive motor, and n is a number of teeth on the internal toothed disc or the external toothed disc. The internal toothed disc and the external toothed disc have a same number of teeth. When the internal toothed disc and the external toothed disc are engaged, the current is uniform or keeps a same change as the load. When the internal toothed disc and the external toothed disc are disengaged (the internal toothed disc and the external toothed disc are slipped off), the load and the current generate a characteristic frequency corresponding fluctuation for a jump of the teeth on the internal toothed disc. The drive motor is provided with a sensing device and a controller. The fluctuation can be captured by the controller of the drive motor, such that the system receives a feedback to know the disengagement between the internal toothed disc and the external toothed disc.

In another embodiment, in order to adjust the blade holder sleeve 1 more stably, the axial limiting device 14 is designed as two symmetric semicircular rings. Two ends of the semicircular rings each are fixedly provided with an extension rod. After the two semicircular rings are docked and clamped into the limiting groove 13, two extension rods located at a same side can abut against each other. The two extension rods located at the same side are hinged to one end of the control rod 2. Two control rods 2 are provided symmetrically to adjust the blade holder sleeve 1 synchronously.

Specific examples are used herein to explain the principles and embodiments of the present disclosure. The foregoing description of the embodiments is merely intended to help understand the method of the present disclosure and its core ideas; besides, various modifications may be made by those of ordinary skill in the art to specific embodiments and the scope of application in accordance with the ideas of the present disclosure. In conclusion, the content of the description shall not be construed as limitations to the present disclosure.

What is claimed is:

1. An active-passive dual overload disengagement mechanism for a mower blade, comprising:

a blade holder configured to connect an output shaft of a drive motor to the mower blade in a transmission manner, and release a transmission state between the output shaft of the drive motor and the mower blade when the mower blade impacts against a hard obstacle; and a control rod comprising one end connected to the blade holder, and the other end connected to a servo motor, wherein the servo motor drives the control rod to move the blade holder to a preset position, and is configured to change the transmission state between the output shaft of the drive motor and the mower blade.

2. The active-passive dual overload disengagement mechanism for a mower blade according to claim 1, wherein the blade holder comprises a blade holder sleeve; one end of the blade holder sleeve is open; an external toothed disc is fixedly and circumferentially provided on an inner sidewall of the other end of the blade holder sleeve; the end of the blade holder sleeve provided with the external toothed disc is provided with a through hole; the output shaft of the drive motor is in transmission connection with an adapter shaft; the adapter shaft penetrates into the through hole of the blade holder sleeve; an end of the adapter shaft located in the blade holder sleeve is fixedly provided with an internal toothed disc; the internal toothed disc is in engagement and transmission connection with the external toothed disc; and the mower blade is fixedly connected to an outer wall of the open end of the blade holder sleeve.

3. The active-passive dual overload disengagement mechanism for a mower blade according to claim 2, wherein an elastic member is fixedly provided on an inner wall of the open end of the blade holder sleeve; a position of the elastic member is capable of being adjusted along an axial direction of the blade holder sleeve; and one end of the elastic member abuts against an end surface of an end of the internal toothed disc away from the adapter shaft.

4. The active-passive dual overload disengagement mechanism for a mower blade according to claim 3, further comprising an adjustment disc, wherein an external screw thread is provided on an outer sidewall of the adjustment disc; an internal screw thread is provided on an inner wall of the blade holder sleeve; the adjustment disc is located in the blade holder sleeve, and threadedly connected to the blade holder sleeve; and the elastic member is located between the adjustment disc and the internal toothed disc.

5. The active-passive dual overload disengagement mechanism for a mower blade according to claim 3, wherein the elastic member is a spring.

6. The active-passive dual overload disengagement mechanism for a mower blade according to claim 2, wherein a limiting groove is circumferentially formed in an outer wall of an end of the blade holder sleeve away from the mower blade; an axial limiting device is nested in the limiting groove; the axial limiting device is capable of rotating relative to the blade holder sleeve; the axial limiting device is fixedly connected to one end of the control rod; and the control rod drives the axial limiting device to move the blade holder sleeve synchronously along an axial direction.

7. The active-passive dual overload disengagement mechanism for a mower blade according to claim 6, wherein the servo motor is provided at an end of the drive motor away from the blade holder sleeve; a motor shaft of the servo motor is perpendicular to the output shaft of the drive motor; the motor shaft of the servo motor is fixedly connected to an eccentric wheel; an outer end surface of the eccentric wheel is movably connected to an L-shaped plate through an eccentric connecting rod; the L-shaped plate is connected to one end of the control rod; and the other end of the control rod is hinged to the axial limiting device.

8. The active-passive dual overload disengagement mechanism for a mower blade according to claim 7, wherein the motor shaft of the servo motor is fixedly connected to a center of the eccentric wheel; the eccentric connecting rod is fixedly provided on the outer end surface of the eccentric wheel; in response to a maximum linear distance between the eccentric connecting rod and the mower blade, the external toothed disc and the internal toothed disc are disengaged; in response to a minimum linear distance between the eccentric connecting rod and the mower blade, the external toothed disc and the internal toothed disc are locked and engaged all the time; and when a linear distance between the eccentric connecting rod and the mower cutter falls between the maximum linear distance and the minimum linear distance, the internal toothed disc and the external toothed disc are in a free state, with an engagement state adjusted passively according to whether the mower blade impacts against the hard obstacle.

9. The active-passive dual overload disengagement mechanism for a mower blade according to claim 6, wherein the axial limiting device comprises two symmetric semicircular rings; two ends of the semicircular rings each are fixedly provided with an extension rod; after the two semicircular rings are docked and clamped into the limiting groove, two extension rods located at a same side abut against each other; and the two extension rods located at the same side are hinged to one end of the control rod.

10. The active-passive dual overload disengagement mechanism for a mower blade according to claim 2, wherein the external toothed disc and the internal toothed disc each are circumferentially provided with oblique teeth.

* * * * *